US010057121B2

(12) United States Patent
Jha et al.

(10) Patent No.: US 10,057,121 B2
(45) Date of Patent: Aug. 21, 2018

(54) TRIGGERING PIM ASSERT RE-ELECTION TO HONOR NETWORK CONFIGURATION CHANGES

(71) Applicant: Telefonaktiebolaget L M Ericsson (publ), Stockholm (SE)

(72) Inventors: Rupak Jha, Vienna, VA (US); Shukri Abdallah, Vienna, VA (US); Sreeju Sreedhar, Vienna, VA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 168 days.

(21) Appl. No.: 14/857,770

(22) Filed: Sep. 17, 2015

(65) Prior Publication Data
US 2017/0085424 A1    Mar. 23, 2017

(51) Int. Cl.
*H04L 12/24*    (2006.01)
*H04L 12/18*    (2006.01)
(Continued)

(52) U.S. Cl.
CPC .......... *H04L 41/0816* (2013.01); *H04L 12/18* (2013.01); *H04L 45/16* (2013.01);
(Continued)

(58) Field of Classification Search
CPC ... H04L 41/0816; H04L 12/18; H04L 47/806; H04L 45/02; H04L 45/60; H04L 45/16; H04L 49/201
See application file for complete search history.

(56) References Cited

U.S. PATENT DOCUMENTS 9,356,789 B1 * 5/2016 Peter ...................... H04L 12/18
2009/0052444 A1 * 2/2009 Ringen .................. H04L 45/00
370/389
(Continued)

OTHER PUBLICATIONS

RFC 1075: Waitzman, et al., "Distance Vector Multicast Routing Protocol," IETF Network Working Group Request for Comments 1075, Nov. 1998, 24 pages.
(Continued)

*Primary Examiner* — Noel R Beharry
*Assistant Examiner* — Richard Schnell
(74) *Attorney, Agent, or Firm* — Nicholson De Vos Webster & Elliott, LLP

(57) ABSTRACT

Exemplary systems, methods, apparatuses, and computer-readable media are provided for enabling PIM Assert re-election to be triggered to honor network configuration changes. Upon receipt of a PIM Join message for a multicast group, a router can enter a "Join" state and start an Expiry-Timer. Thereafter, the router may determine that it is an Assert-Loser for the multicast group via a PIM Assert election mechanism. At the expiration of the Expiry-Timer, instead of transitioning to a "No-Info" state and removing state for the multicast group, the router can, due to its status as the Assert-Loser for the multicast group, remain in the "Join" state and re-start the Expiry-Timer. Upon a later configuration change, the router can now automatically trigger a PIM Assert re-election, which can lead to the router potentially becoming the Assert-Winner without requiring a manual, traffic-disrupting intervention.

18 Claims, 10 Drawing Sheets

(51) Int. Cl.
*H04L 12/773* (2013.01)
*H04L 12/761* (2013.01)
*H04L 12/751* (2013.01)
*H04L 12/927* (2013.01)
*H04L 12/931* (2013.01)

(52) U.S. Cl.
CPC ............ *H04L 45/60* (2013.01); *H04L 47/806* (2013.01); *H04L 49/201* (2013.01); *H04L 45/02* (2013.01)

(56) References Cited

U.S. PATENT DOCUMENTS

2010/0165988 A1* 7/2010 Soccol .................. H04L 12/185
 370/390
2013/0294448 A1 11/2013 Mentze et al.

OTHER PUBLICATIONS

RFC 1584: Moy, "Multicast Extensions to OSPF," Network Working Group Request for Comments 1584, Mar. 1994, 70 pages.

RFC 1585: Moy, "MOSPF: Analysis and Experience," IETF Network Working Group, Request for Comments: 1585, Mar. 1994, 13 pages.

RFC 2117: Estrin, et al., "Protocol Independent Multicast-Sparse Mode (PIM-SM): Protocol Specification," Network Working Group Request for Comments 2117, Jun. 1997, 66 pages.

RFC 2189: Ballardie, "Core Based Trees (CBT version 2) Multicast Routing—Protocol Specification—", Network Working Group Request for Comments 2189, Sep. 1997, 23 pages.

RFC 2328: Moy, "OSPF Version 2," The Internet Society, Network Working Group, Request for Comments 2328, Apr. 1998, 244 pages.

RFC 2362: Estrin, et al., "Protocol Independent Multicast-Sparse Mode (PIM-SM): Protocol Specification," The Internet Society, Network Working Group Request for Comments 2362, Jun. 1998, 66 pages.

RFC 2740: Coltun, et al., "OSPF for IPv6," The Internet Society, Network Working Group Request for Comments 2740, Dec. 1999, 80 pages.

RFC 4601: Fenner, et al., "Protocol Independent Multicast—Sparse Mode (PIM-SM): Protocol Specification (Revised)," The Internet Society, Network Working Group Request for Comments 4601, Aug. 2006, 112 pages.

RFC 5015: Handley, et al., "Bidirectional Protocol Independent Multicast (BIDIR-PIM)," Network Working Group, Request for Comments: 5015, Oct. 2007, 43 pages.

RFC 7761: Fenner, et al., "Protocol Independent Multicast—Sparse Mode (PIM-SM): Protocol Specification (Revised)," Internet Engineering Task Force (IETF), Request for Comments: 7761, Mar. 2016, 137 pages.

\* cited by examiner

EXEMPLARY VENDOR-SPECIFIC DEFAULT ROUTE-PREFERENCE VALUES 200

| ROUTE SOURCE 202 | DEFAULT ROUTE-PREFERENCE ON "VENDOR1" DEVICES 205 | DEFAULT ROUTE-PREFERENCE ON "VENDOR2" DEVICES 210 | DEFAULT ROUTE-PREFERENCE ON "VENDOR3" DEVICES 215 |
|---|---|---|---|
| Connected interface | 0 | 0 | 0 |
| Static route | 1 | 5 | 60 |
| Enhanced Interior Gateway Routing Protocol (EIGRP) summary route | 5 | Not Supported | Not Supported |
| External Border Gateway Protocol (BGP) | 20 | 170 | 255 |
| Internal EIGRP | 90 | Not Supported | Not Supported |
| IGRP | 100 | Not Supported | Not Supported |
| OSPF All | 110 | - | - |
| OSPF Internal | - | 10 | 10 |
| OSPF External | - | 150 | 150 |
| Intermediate System -to- Intermediate System (IS-IS) | 115 | 160 | 15 |
| Routing Information Protocol (RIP) | 120 | 100 | 100 |
| Exterior Gateway Protocol (EGP) | 140 | - | - |
| External EIGRP | 170 | Not Supported | Not Supported |
| Internal BGP | 200 | 170 | 255 |
| Unknown* | 255 | | |

*FIG. 2*

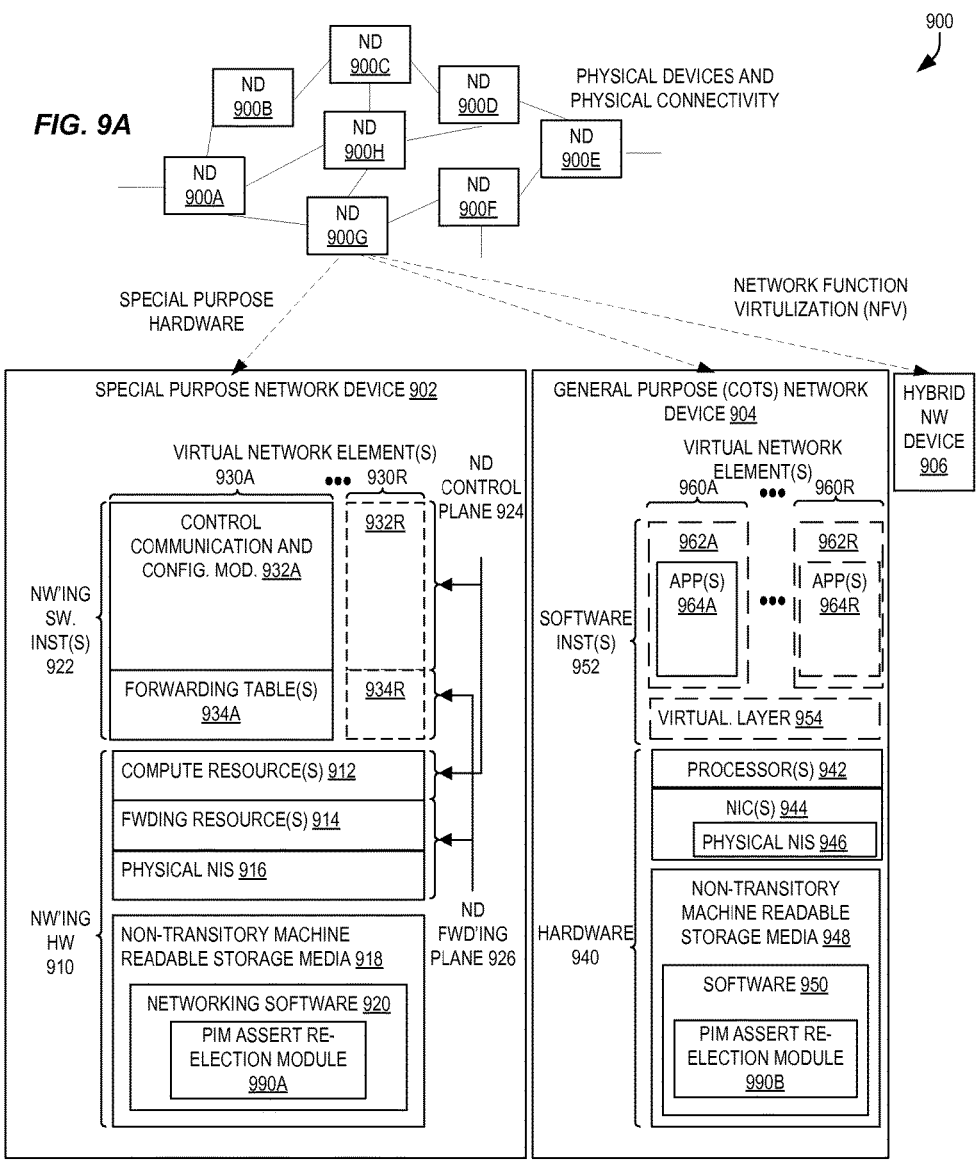
FIG. 9A
FIG. 9B
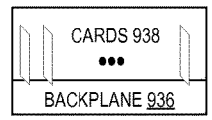

TRIGGERING PIM ASSERT RE-ELECTION TO HONOR NETWORK CONFIGURATION CHANGES

FIELD

Embodiments relate to the field of computing systems, and more specifically, to triggering PIM Assert re-election to honor network configuration changes.

BACKGROUND

Internet Protocol (IP) multicast is a technology for delivering IP traffic from one (or more) source to many receivers. IP multicast technology has been specified in a number of Internet Engineering Task Force (IETF) Request for Comments (RFCs), such as, RFC 1075, RFC 1584, RFC 1585, RFC 2117, RFC 2189, RFC 2362 and RFC 4601.

Multicast network technology allows one or more hosts, as multicast source(s), to transmit a single data packet to multiple hosts. When compared with unicast, no matter how many receivers exist, the data packet is transmitted by the source only once. In contrast, using traditional unicast techniques, the data source has to send as many copies of the data packet as the number of the receivers. Therefore, multicast is a substantially more efficient data transmission technique and is particularly applicable in point-to-multipoint or multipoint-to-multipoint application environments.

When a host (or "receiver") desires to receive multicast data, it joins a multicast group, which can be identified by a network address (e.g., a Class D IP address). When a multicast-enabled router receives the message indicating that the host seeks to join in the multicast group, the router can establish a multicast tree between a source and the receiver so as to direct the multicast data to reach the receiver. Similarly, when the receiver exits from the group, the multicast router may remove the connection between the multicast source and the receiver.

IP multicast technology is widely deployed in many systems such as stock exchanges, content-delivery networks (CDNs), Internet Protocol Television (IPTV) applications, and distance learning. Some of the most widely-used multicast protocols are of the Protocol-Independent Multicast (PIM) family, including PIM-Sparse Mode (PIM-SM) and PIM Source-Specific Multicast (PIM-SSM). PIM-SM/SSM depends on unicast routing protocols such as Open Shortest Path First (OSPF) v2 (as specified in RFC 2328) or v3 (as specified in RFC 2740) to build a multicast distribution tree.

Because multicast traffic often involves large, largely continuous streams of data (e.g., such as a live audio-visual feed of a sporting event or concert) being delivered to many recipients, it is imperative to avoid duplication of forwarding effort for this time-sensitive, high-volume traffic as much as possible. For example, if two routers that receive copies of multicast packets from a same source, it is not very efficient for both of these routers to forward the packets onto a same network segment toward one or more recipients, because this would result in duplicated traffic and thus a waste of bandwidth and processing power. Although there are some techniques for preventing multicast traffic from being unnecessarily duplicated in a network segment, these techniques can result in other problems, such as an increased difficulty of managing particular traffic paths for traffic. Accordingly, there remains a strong need for systems that can prevent multicast traffic from being unnecessarily duplicated without these problems.

SUMMARY

Systems, methods, apparatuses, and computer-readable media are provided for enabling PIM Assert re-election to be triggered to honor network configuration changes. In some embodiments, upon receipt of a PIM Join message for a multicast group, a router can enter a "Join" state and start an Expiry-Timer. Thereafter, the router may determine that it is an Assert-Loser for the multicast group via a PIM Assert election mechanism. At the expiration of the Expiry-Timer, instead of transitioning to a "No-Info" state and removing state for the multicast group, the router can, due to its status as the Assert-Loser for the multicast group, remain in the "Join" state and re-start the Expiry-Timer. Accordingly, upon a later configuration change that could cause the router to become the Assert-Winner for the multicast group, the router can now automatically trigger a PIM Assert re-election (e.g., transmit a PIM Assert message to the other router(s)), which can lead to the router properly becoming the Assert-Winner without requiring a manual, traffic-disrupting intervention on the part of a network administrator.

According to some embodiments, an exemplary method performed by a network element acting as a router for honoring routing configuration changes by triggering PIM Assert re-election without multicast traffic interruption includes receiving, at the router, a PIM join message from a downstream router indicating that the router is to forward multicast traffic because it lies on a path between one or more senders and one or more receivers of a multicast group. The method further includes starting, by the router as part of entering a Join state responsive to the receipt of the PIM join message, an Expiry-Timer associated with the multicast traffic. The method also includes receiving, at the router, a first PIM Assert message from another router, and determining, based upon the first PIM Assert message, that the router is an Assert-Loser for the multicast traffic, while the another router is an Assert-Winner for the multicast traffic. The method further includes, upon an expiry of the Expiry-Timer, and based upon the router being the Assert-Loser, remaining in the Join state and restarting the Expiry-Timer.

In some embodiments, the method further includes after the restarting of the Expiry-Timer and while the router remains in the Join state, determining that a router configuration data value has changed, and initiating a PIM Assert re-election by transmitting a second PIM Assert message including the changed router configuration data to the another router. In some embodiments, the router configuration data comprises at least one of a route-preference value, a route-metric value, and a network address of the router.

In some embodiments, the method further includes receiving a third PIM Assert message from the another router, and determining, based upon the another PIM Assert message, that the router is now the Assert-Winner for the multicast traffic. In some embodiments, after the determining that the router is now the Assert-Winner, the method further includes receiving one or more packets of the multicast traffic at an incoming interface, and sending the one or more packets of the multicast traffic out one or more outbound interfaces.

According to some embodiments, the another router is part of another path for the multicast traffic leading to another receiver of the multicast group, and the router and the another router are managed by different administrative authorities or manufactured by different vendors.

According to some embodiments, an electronic device includes one or more processors and one or more non-transitory computer-readable storage media storing instructions which, when executed by the one or more processors, cause the electronic device to implement a router configured to honor routing configuration changes by triggering PIM Assert re-election without multicast traffic interruption by performing the operations of any of the above methods.

In some embodiments, a non-transitory computer-readable storage media stores instructions which, when executed by one or more processors of a network device, cause the network device to implement a router configured to honor routing configuration changes by triggering PIM Assert re-election without multicast traffic interruption by performing the operations of any of the above methods.

According to some embodiments, an electronic device configured to act as a router for honoring routing configuration changes by triggering PIM Assert re-election without multicast traffic interruption includes a receiving module, a timer starting module, a determining module, and a state module. The receiving module is configured to receive a PIM join message from a downstream router indicating that the router is to forward multicast traffic because it lies on a path between one or more senders and one or more receivers of a multicast group. The timer starting module is configured to start, as part of entering a Join state responsive to the receipt of the PIM join message, an Expiry-Timer associated with the multicast traffic. The receiving module is further configured to receive a first PIM Assert message from another router. The determining module is configured to determine, based upon the first PIM Assert message, that the router is an Assert-Loser for the multicast traffic, while the another router is an Assert-Winner for the multicast traffic. The state module is configured to cause the router to remain, upon an expiry of the Expiry-Timer, and based upon the router being the Assert-Loser, in the Join state and to cause the timer starting module to restart the Expiry-Timer.

BRIEF DESCRIPTION OF THE DRAWINGS

Embodiments of the invention may best be understood by referring to the following description and accompanying drawings. In the drawings:

FIG. 2 is a table illustrating exemplary vendor-specific default route-preference values.

FIG. 9A illustrates connectivity between network devices (NDs) within an exemplary network, as well as three exemplary implementations of the NDs, according to some embodiments.

FIG. 9B illustrates an exemplary way to implement a special-purpose network device according to some embodiments.

DESCRIPTION OF EMBODIMENTS

Figure 1:
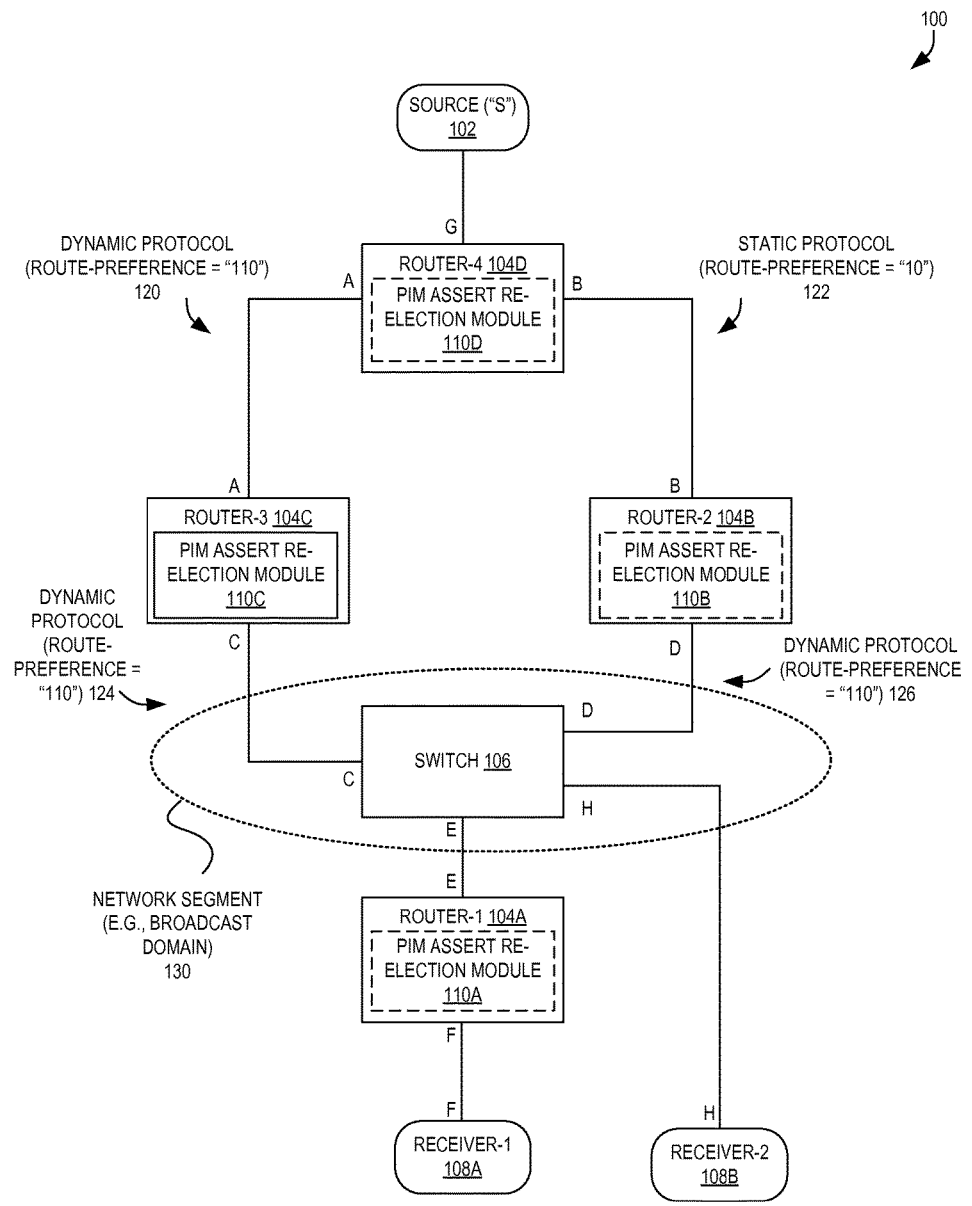
FIG. 1 is a block diagram illustrating a system including a multicast source providing multicast traffic to multiple receivers through a common network segment according to some embodiments.

The following description relates to the field of computing systems, and more specifically, describes methods, systems, apparatuses, and computer-readable media for enabling PIM Assert re-election to be triggered to honor network configuration changes.

In some embodiments, upon receipt of a PIM Join message for a multicast group, a router can enter a "Join" state and start an Expiry-Timer. Thereafter, the router may determine that it is an Assert-Loser for the multicast group via a PIM Assert election exchange. At the expiration of the Expiry-Timer, instead of transitioning to a "No-Info" state and removing state for the multicast group, the router can, due to its status as the Assert-Loser, remain in the "Join" state and re-start the Expiry-Timer. Accordingly, upon a later configuration change that could cause the router to become the Assert-Winner for the multicast group, the router is now enabled to automatically trigger a PIM Assert re-election (e.g., transmit a PIM Assert message to the other router(s)), which can automatically lead to the router properly becoming the Assert-Winner without requiring a manual, traffic-disrupting intervention on the part of a network administrator.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to various embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As described above, to avoid unnecessary network congestion and unnecessary forwarding element processing, it is imperative to avoid having multiple routers forwarding the same multicast traffic in a particular network segment. To address this concern, the PIM-SM/SSM protocol includes features designed to avoid such duplication of effort.

To explore this issue and these traffic optimization features of the PIM-SM/SSM protocol, we turn to FIG. 1. FIG. 1 is a block diagram illustrating a system 100 including a multicast source 102 ("S") providing multicast traffic to multiple receivers (i.e., "Receiver-1" 108A and "Receiver-2" 108B) of a group through a common network segment 130 according to some embodiments.

In FIG. 1, Source 102 is a source of multicast traffic for a destination multicast group "G" of which Receiver-1 108A and Receiver-2 108B have indicated an interest in receiving (e.g., by sending Internet Group Management Protocol version 3 (IGMPv3) Report messages). Source 102 may be represented by a unicast IP address, and the multicast group may be represented by a class D IP address.

FIG. 1 also includes network segment 130 (e.g., a Local Area Network (LAN), a broadcast domain, a subnet, a Virtual LAN (VLAN), etc.) having a switch 106 and three routers—Router-1 104A, Router-2 104B, and Router-3 104C—that each run the PIM-SSM protocol. Because there is a receiver (i.e., Receiver-2 108B) as part of network segment 130, Router-2 104B and Router-3 104C may be IGMPv3 speakers. Similarly, Router-1 104A may also be an IGMPv3 speaker due to the presence of Receiver-1 108A.

Each router 104 can maintain a multicast routing table referred to as a Multicast Routing Information Base, or "MRIB." The MRIB can include multicast routing entries of the form <I, S, G, OIFList> where "I" is the Reverse Path Forwarding (RPF) interface to the Source 102, "S" is the IPv4/IPv6 source address of the Source 102, "G" is the IPv4/IPv6 destination address of the multicast group, and "OIFList" is a set of outbound interface identifiers on which the multicast traffic for the group is to be replicated. For example, in FIG. 1, the MRIB at Router-2 104B can contain a multicast routing entry of <B, S, G, {d}>, which indicates that the its RPF interface toward the source is interface "B", the source address of Source 102 is some "S", the destination address of the multicast group is some "G", and that traffic of this source-group pair is to be replicated out its interface "D" (leading to switch 106).

In some scenarios, it is possible that Receiver-2 108B and downstream Router-1 104A may receive multiple copies of the same multicast data traffic—e.g., one copy sent by Router-3 104C and another copy sent by Router-2 104B. For example, RFC 4601 discusses a specific case where receivers may receive duplicate copies of multicast data traffic. This duplication results from the presence of multiple administrative authorities and the use of different route-preference values by different router vendors.

For example, we assume that Router-2 104B and Router-3 104C are being managed by different administrative authorities (e.g., different owners, individuals, companies, organizations, etc.). The administrative authority of Router-3 104C chose to run a dynamic protocol 120 (e.g., OSPF) between Router-3 104C and Router-4 104D, while the administrative authority of Router-2 104B decided to configure static-routing 122 between Router-2 104B and Router-4 104D. Additionally, both administrative authorities have agreed to run a dynamic protocol 126 (e.g., OSPF) on network segment 130 between Router-1 104A, Router-2 104B, and Router-3 104C. As a result, from the point of view of Router-1 104A, a route back to the source 102 is only reachable via upstream neighbor Router-3 104C, as Router-1 104A has no visibility into a route to source 102 via Router-2 104B because Router-2 104B has not distributed the static routes into the network segment 130 OSPF domain.

Further, as described by RFC 4601, route-preference values influence the RPF decisions made by PIM-SM/SSM. For example, the unicast routing protocol determines the best route based on a route-preference value assigned to each unicast routing protocol. In FIG. 1, the dynamic protocol 120 utilized between Router-3 104C and Router-4 104D may have a router-preference value of "110", while the static protocol 122 utilized between Router-2 104B and Router-4 104D may have a router-preference value of "10". These values are often set based upon default values from router vendors, although they can also be manually configured by a particular operator. For example, FIG. 2 is a table 200 illustrating exemplary vendor-specific default route-preference values. The first column, route source 202, shows different route sources (e.g., routing protocols such as OSPF, Routing Information Protocol (RIP), Border Gateway Protocol (BGP), Static Route, etc.), and each of the other three columns (205, 210, 215) show different default route-preference values configured for these route sources by different vendors. Thus, FIG. 2 shows that different router vendors can and do assign, by default, different route-preference values to routes discovered by a same routing protocol. For example, for an OSPF Internal route, a first vendor ("VENDOR1") may assign a route-preference of "110", while both the second vendor ("VENDOR2") and the third vendor ("VENDOR3") assign a default router-preference value of "10."

Turning back to FIG. 1, due to the different administrative authorities managing Router-2 104B and Router-3 104C, and further due to Router-2 104B and Router-3 104C being manufactured by different vendors (and having different default configuration data, such as default router-preference values), a problematic situation may arise.

We initially stipulate that based on the unicast routing table of Router-2 104B, in order to reach the source 102, the best route is the static route with RPF(S)→B. Additionally, based on the unicast routing table of Router-3 104C, the best route to reach the source 102 is an OSPF route with RPF(S)→A.

Further, Router-2 104B will have an entry in its PIM-SSM MRIB table for the multicast group with an OIFList including interface "D," and Router-3 104C will have an entry in its PIM-SSM MRIB table for the multicast group with an OIFList including interface C.

When source 102 becomes active and thus begins transmitting multicast data, Router-4 104D sends traffic on its OIFList {A, B}, meaning that it will be passed to both Router-2 104B and Router-3 104C. Router-2 104B will then send a copy on the OIFList {D}, and Router-3 104C will send a copy on the OIFList {C}. As a result, both Router-2

104B and Router-3 104C have sent the same data into the network segment 130, and thus the switch 106, Receiver-2 108B, Router-1 104A, and ultimately Receiver-1 108A (via Router-1 104A) will receive two copies of the same traffic.

This problematic occurrence results from the following situation. When Receiver-1 108A desires to join the multicast group, it may transmit an IGMP Report message to Router-1 104A. In turn, based on RFC 4601, because Router-3 104C is the upstream neighbor for Router-1 104A, Router-1 104A will send a PIM Join message to Router-3 104C, which in turn will send a PIM Join message to Router-4 104D. As a result, Router-3 104C will have a multicast routing entry of the form <A, S, G, {C}>.

Additionally, when Receiver-2 108B desires to join the multicast group, it may transmit an IGMP Report message to Router-2 104B, as Router-2 may be the Designated Router on network segment 130, and since there is a Receiver-2 108B on network segment 130, Router-2 104B will send a PIM Join towards Router-4 104D. As a result, Router-2 104B will have a multicast routing entry of the form <B, S, G, {D}>.

Because Router-4 104D receives two PIM Join messages—i.e., one on interface (A) from Router-3 104C and one on interface (B) from Router-2 104B—Router-4 104D will have both interfaces (A) and (B) in the OIFList of the routing entry: <G, S, G, {A, B}>.

When source 102 becomes active, Router-4 104D will send a copy of the multicast traffic on both interfaces (A) and (B). Router-3 104C in turn will send a copy on network segment 130, and Router-2 104B will also send another copy on network segment 130. This results in a situation where Receiver-2 and Router-1 104A (and thus, Receiver-1 108A) will receive these two copies of the same multicast packet. Accordingly, the network segment 130 includes extraneous duplicate traffic that wastes it available bandwidth and needlessly consumes its forwarding/processing resources of the involved network devices.

RFC 4601, however, does provide a mechanism to eliminate the duplication of the multicast traffic on network segment 130. However, this mechanism has a significant drawback.

RFC 4601 teaches, to avoid duplication of shared traffic in a shared network segment, that PIM routers connected to the shared segment can elect a single forwarder of the multicast traffic for that particular segment. Because PIM does not have its own routing protocol that could be used to determine the best path to send data across, it utilizes a special mechanism referred to as the PIM Assert mechanism (or "election") to make the determination of which router should continue forwarding the traffic and which router(s) should stop.

The PIM Assert election mechanism is triggered when a router receives multicast traffic on one of the interfaces in its OIFList (i.e., outgoing interfaces) for that same multicast entry. Continuing the example of FIG. 1, when both Router-2 104B and Router-3 104C provide the same multicast traffic on the network segment 130, each of these routers 104B-104C will receive the multicast traffic transmitted by the other router on its OIFList outgoing interface.

Consider the case where Router-2 104B receives the multicast traffic from Router-3 104C on its interface D. As Router-2 104B has the multicast routing entry <B, S, G, {D}>, it will detect that D is in the OIFList for that multicast source-group "(S, G)" entry and, in response, will send a PIM Assert message indicating one or more network configuration values (e.g., a route-metric value toward the source 102, a route-preference value toward the source 102, an IP address of the RPF interface to source 102, etc.). Upon receiving the PIM Assert message, Router-3 104C will determine whether it is an Assert-Loser or Assert-Winner by comparing its network configuration values (e.g., its route-metric, route-preference, and/or IP address of the RPF interface) according to a known comparison algorithm. For example, the assert election criteria may be based upon determining which of the routers has a smallest route-preference value to the source (e.g., which uses a "most reliable" routing protocol). If no winner is found at this point, the assert election criteria may further include determining which route-metric value to the source is the lowest (e.g., which route has a least cost). If no winner is found at this point, the assert election criteria may further include determining which router has a highest (or lowest) IP address.

As described earlier with regard to FIG. 2, route-preference values can be different per router vendor, and the route-metric values (as well as IP addresses) can be specified by the different administrative authorities of Router-3 104C and Router-2 104B.

Similarly, Router-3 104C will also send on network segment 130 a PIM Assert message indicating its own configuration data (e.g., route-preference value, route-metric value, and/or interface IP address value, etc.) allowing Router-2 104B to conduct the same comparison and to arrive at the same conclusion.

Of note is that Router-1 104A will not send a PIM Assert message because it is a downstream router on network segment 130. However, Router-1 104A will receive the PIM Assert messages of Router-2 104B and Router-3 104C, and can perform the same comparison algorithm to likewise arrive at the same conclusion as to which router is the Assert-Winner (and/or which router is the Assert-Loser).

Thus, the upstream neighbor of Router-1 104A (i.e., Router-3 104C) is to be the Assert-Loser, and Router-1 104A will send a PIM Join message which will be received by the Assert-Winner, Router-2 104B, and thus the path from the source 102 will be determined to flow through Router-2 104B instead of Router-3 104C. In this case, Router-2 will have no state change.

However, as the Assert-Loser, Router-3 104C will prune interface (C) from the OIFList for the (S, G) MRIB entry. Thus, Router-3 104C will not receive the PIM Join message sent by Router-1 104A, and thus its Expiry Timer will expire and then the multicast traffic from source 102 will stop flowing from Router-3 104C to network segment 130. This occurs because Router-3 will maintain the Assert-Loser state for a period of time indicated by an Expiry-Timer "ET" (e.g., 210 seconds). Based on RFC 4601, when the Expiry-Timer expires at Router-3 104C, although the Assert-Loser state is present, the router is to transition to a "No-Info" state, and thus may remove its state associated with the multicast group.

Figure 3:
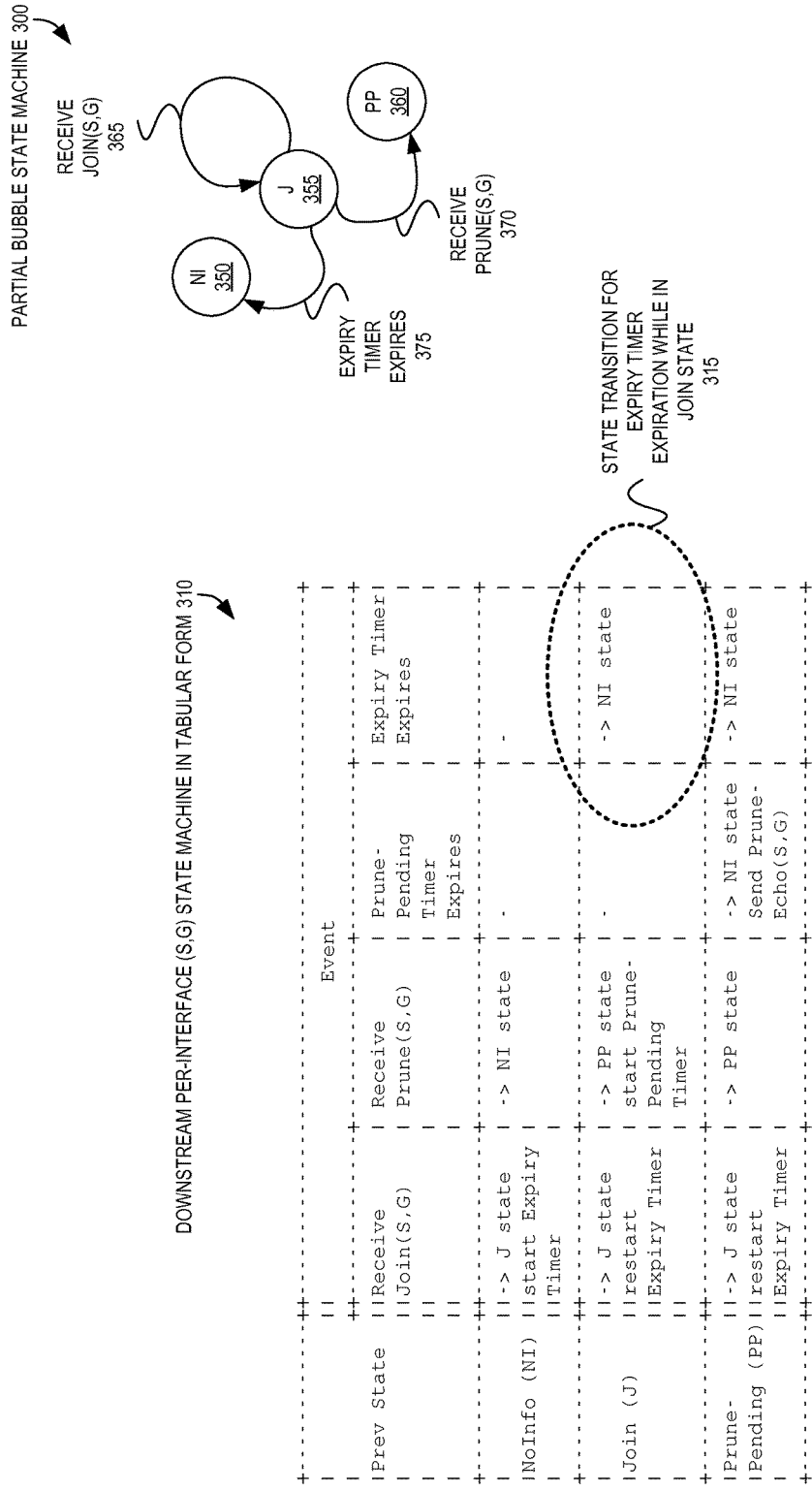
FIG. 3 illustrates prior art tabular and bubble state machines for downstream per-interface (S, G) PIM-SM operation.

For example, we now turn to FIG. 3, which illustrates prior art tabular 310 and bubble 300 state machines for downstream per-interface (S, G) PIM-SM operation according to RFC 4601.

The tabular state machine 310, or downstream per-interface (S, G) state machine in tabular form includes three rows indicating different starting states: No-Info, Join, and Prune-Pending. In this discussion, of most concern in this context is the Join (J) row, which is entered when a PIM router receives a PIM Join message. The columns of the tabular state machine 310 indicate different events that can occur: Receive Join (S, G), Receive Prune (S, G), Prune-Pending Timer Expires, and Expiry Timer Expires. The values at the intersection of the rows and columns indicate the actions and/or state changes that are to occur based upon the existing (or "previous") state of the router (i.e., the row) combined with the particular event (i.e., the column).

Of particular note in this example is the state transition (which is circled) for the Expiry Timer expiration while the router is in the Join state 315. When a router is in the Join state and the Expiry Timer expires (which was started/restarted upon receipt of a Join, as further indicated in this table), RFC 4601 stipulates that the router is to switch to the "No-Info" state (i.e., "NI state"). In this state, the router maintains no (S, G) Join state and no (S, G) timers are running.

This Join (J) row of the tabular state machine 310 is also illustrated in the partial bubble state machine 300, which includes three states: Join (J) 355, No-Info (NI) 350, and Prune-Pending (PP) 360. While in the Join state 355, upon receipt of a Join(S, G) 365, the router will stay in the Join state 355 (and the Expiry Timer will be restarted). Additionally, while in the Join state 355, upon receipt of a Prune(S, G) message, the router will transition to the Prune-Pending 360 state (and the Prune-Pending Timer will be started). Further, while in the Join state 355, upon the Expiry Timer expiring, the router will switch to the No-Info state 350, and remove its state for the multicast group.

In the above-described scenario, Router-3 104C will enter the Join state upon receipt of a PIM Join message from Router-1 104A, and Router-3 104C will start its Expiry Timer. Typically, Router-1 104A may periodically transmit PIM Join messages to Router-3 104C to keep the multicast group path open and the traffic flowing, because upon receipt of the subsequent PIM Join messages, Router-3 104C will reset its Expiry Timer and stay in the Join state. However, at some point when Router-1 104A determines that Router-2 104B is the Assert-Winner, it will no longer provide any additional PIM Join messages to Router-3 104C. Thus, at some point the Expiry Timer of Router-3 104C will expire, and per the circled state transition 315, the Router-3 104C will enter the No-Info state and eliminate its state for the multicast group.

However, this result creates a further problem: if any of the certain configuration values utilized in the PIM Assert election decision-making process (for determining the Assert-Winner and Assert-Loser) are changed, the PIM Assert election process will not occur again, and thus, regardless of whether Router-3 104C should become the rightful Assert-Winner and Router-2 104B should become the rightful Assert-Loser, this re-election will not occur.

For example, a changing of the route-preference value to source 102 at Router-3 104C will not result in a re-evaluation of the Assert-Winner. It is important to note that this case arises due to having multiple administrative authorities managing the metrics of the routers on the network segment 130. Moreover, as FIG. 2 shows, the route-preference values by default are determined by the different vendors that manufacture the routers. Thus, if we assume that the administrator of Router-3 104C changed the preference for OSPF routes from "110" to "8", this change should trigger a new PIM Assert election on network segment 130 that results in Router-3 104C being deemed the Assert-Winner. However, based on the current specification of RFC 4601, such an election will not occur. This is due to Router-3 104C losing the Assert-Loser information upon the expiry of the Join state Expiry-Timer. Thus, the multicast traffic will not flow on the multicast tree that is based on the original intention of RFC 4601 to follow the decisions of the unicast routing protocols based on route-preference.

Additionally, if Router-2 104B and Router-3 104C use the same route-preference value for different protocols, but the Assert-Loser changes the route-metric towards source 102, again a PIM Assert re-election will not be triggered.

Figure 4:
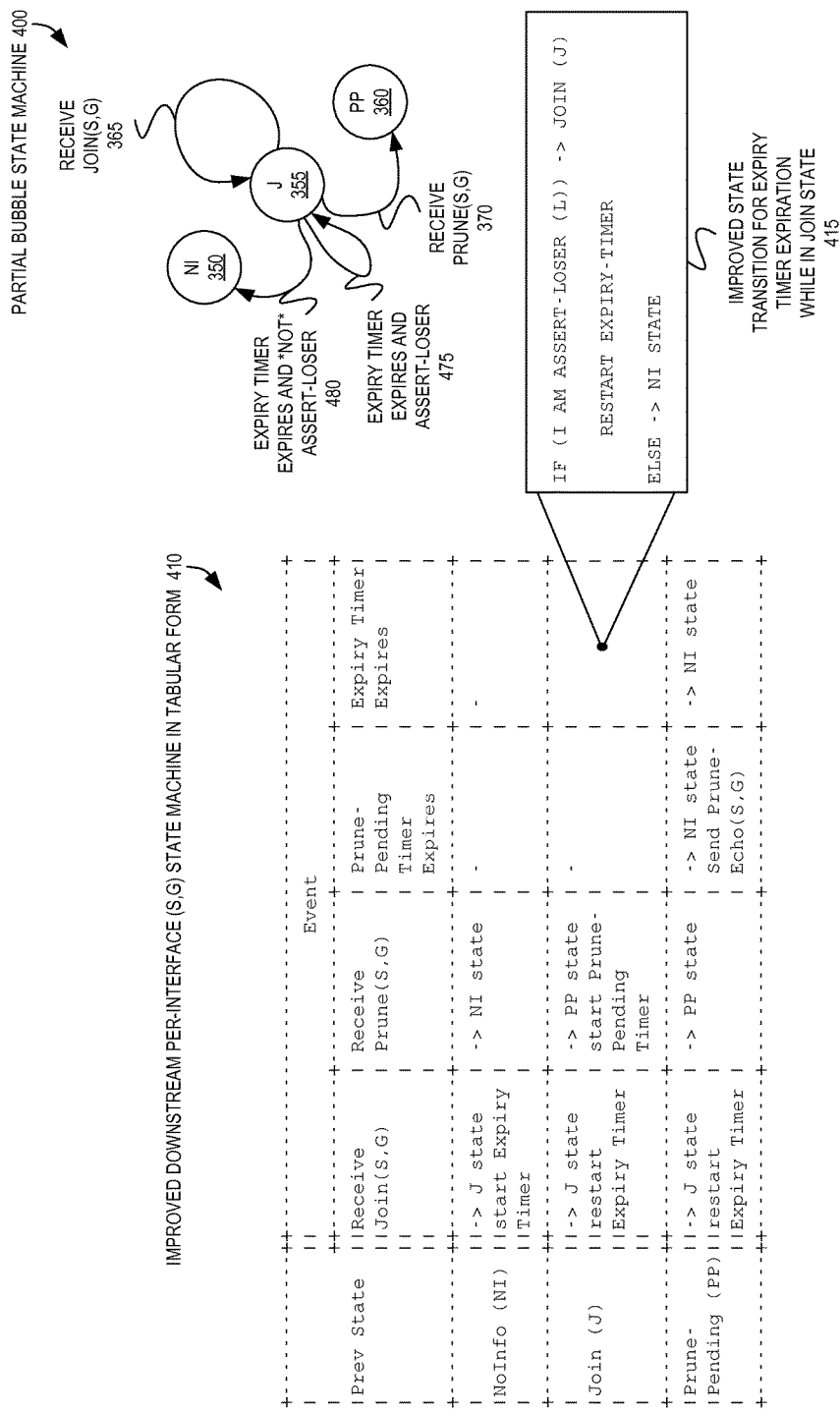
FIG. 4 illustrates improved tabular and bubble state machines for downstream per-interface (S, G) PIM-SM operation for triggering PIM Assert re-election to honor network configuration changes according to some embodiments.

Thus, according to some embodiments, PIM Assert elections can be triggered in such scenarios by having the router maintain the Assert-Loser state in the (S, G) as long as there is an Assert-Winner on that network segment 130. For example, FIG. 4 illustrates improved tabular 410 and bubble 400 state machines for downstream per-interface (S, G) PIM-SM operation for triggering PIM Assert re-election to honor network configuration changes according to some embodiments. In some embodiments, some or all of these state machines and related operations can be performed by the PIM Assert Re-Election Module 110A-D of Routers 104A-104D.

The improved downstream per-interface (S, G) state machine in tabular form 410 is similar to the prior art table 310 of FIG. 3 (from RFC 4601 section 4.5.3) although one significant difference exists. In particular, while a router is in the Join (J) state, upon the Expiry Timer expiring, the router will now determine whether it is an Assert-Loser for the multicast group. If so, the router will remain in the Join (J) state and will further restart the Expiry Timer; if not, the router will enter the No-Info (NI) state.

This significant change is also reflected in the partial bubble state machine 400. The partial bubble state machine 400 does include the same states (350, 355, 360) and two of the same transitions (365, 370) of the prior art partial bubble state machine 300 of FIG. 3. However, there are notable changes—while in the Join (J) state 355 and the Expiry Timer expires, the router will no longer automatically transition to the No-Info (NI) state 350. Instead, if the Expiry Timer expires and the router is an Assert-Loser for the multicast group 475, the router will remain in the Join (J) state 355, and also restart the Expiry Timer. Also, if the Expiry Timer expires and the router is not an Assert-Loser for the multicast group 480, the router will transition to the No-Info (NI) state 350. Thus, due to remaining in the Join (J) state 355 due to the router being the Assert-Loser, a relevant configuration data change will cause the router to begin a PIM Assert election again by sending a PIM Assert message that will be received by Router-2 104B and Router-1 104A.

To further clarify the distinction between the prior art state machine(s) of FIG. 3 with the improved state machine(s) of FIG. 4, we continue with the example presented in FIG. 1. Assuming the use of the prior art state machine of FIG. 3 (i.e., adhering to the proscribed protocol from RFC 4601), if, after the expiration of the Expiry-Timer, a user has changed a route-preference or route-metric configuration value in an effort to force Router-3 104C to become the Assert-Winner for the multicast group (instead of Router-2 104B), a PIM re-election will not occur on network segment 130 and thus, the multicast traffic will continue to flow through Router-2 104B, contrary to the desire of the user. Thus, in order to trigger the PIM re-election, the user would then be forced to perform additional traffic-interrupting tasks, such as removing Receiver-2 108B from the network segment 130, or disabling and then again enabling interface D on Router-2 104B towards the network segment 130. However, both actions involve additional manual intervention and perhaps more distressingly, result in the interruption of the delivery of the multicast traffic.

In contrast, assuming the use of the improved state machine(s) of FIG. 4 by the PIM Assert Re-Election Module 110C of Router-3 104C (which does not adhere to the proscribed protocol from RFC 4601), if, after the expiration of the Expiry-Timer, the user has changed a route-preference or route-metric configuration value in an effort to force Router-3 104C to become the Assert-Winner for the multicast group (instead of Router-2 104B), the PIM re-election will occur on network segment 130 and thus, the re-election algorithm will kick in automatically on the change of router-preference and/or router-metric without loss of multicast traffic. Accordingly, the user would not need to perform additional traffic-interrupting tasks, such as removing Receiver-2 108B from the network segment 130, or disabling and then again enabling interface D on Router-2 104B towards the network segment 130.

Further, these techniques are not specific to the specific case described in FIG. 1 only, but also applies to network segments (e.g., subnets) where there are more downstream routers (e.g., a Router-5) similar to Router-1 104A and belonging to the same administrative domain as Router-2 104B. In FIG. 1, the presence of Receiver-2 108B and the fact that Router-2 104B is the designated router for the network segment 130 contributed the duplicate traffic flow. In the general case where there are no receivers on the network segment 130, but there are downstream routers like a Router-5 (belonging to the same administrative domain as Router-2 104B), duplicate traffic will similarly be caused to flow.

Accordingly, various embodiments can enable the triggering of PIM Assert re-elections to honor network configuration changes where the network segment 130 has: (i) receivers (such as Receiver-2 108B) with Router-2 104B and Router-3 104C belonging to different administrative domains; (ii) no receivers (such as Receiver-2 108B) attached to the network segment 130, but more downstream routers such as Router-1 104A and a similar Router-5 where Router-1 104A and Router-3 104C belong to same administrative domain and Router-2 104B and Router-5 would belong to other administrative domain; and (iii) configurations having a combination of both scenarios (i) and (ii).

Figure 5:
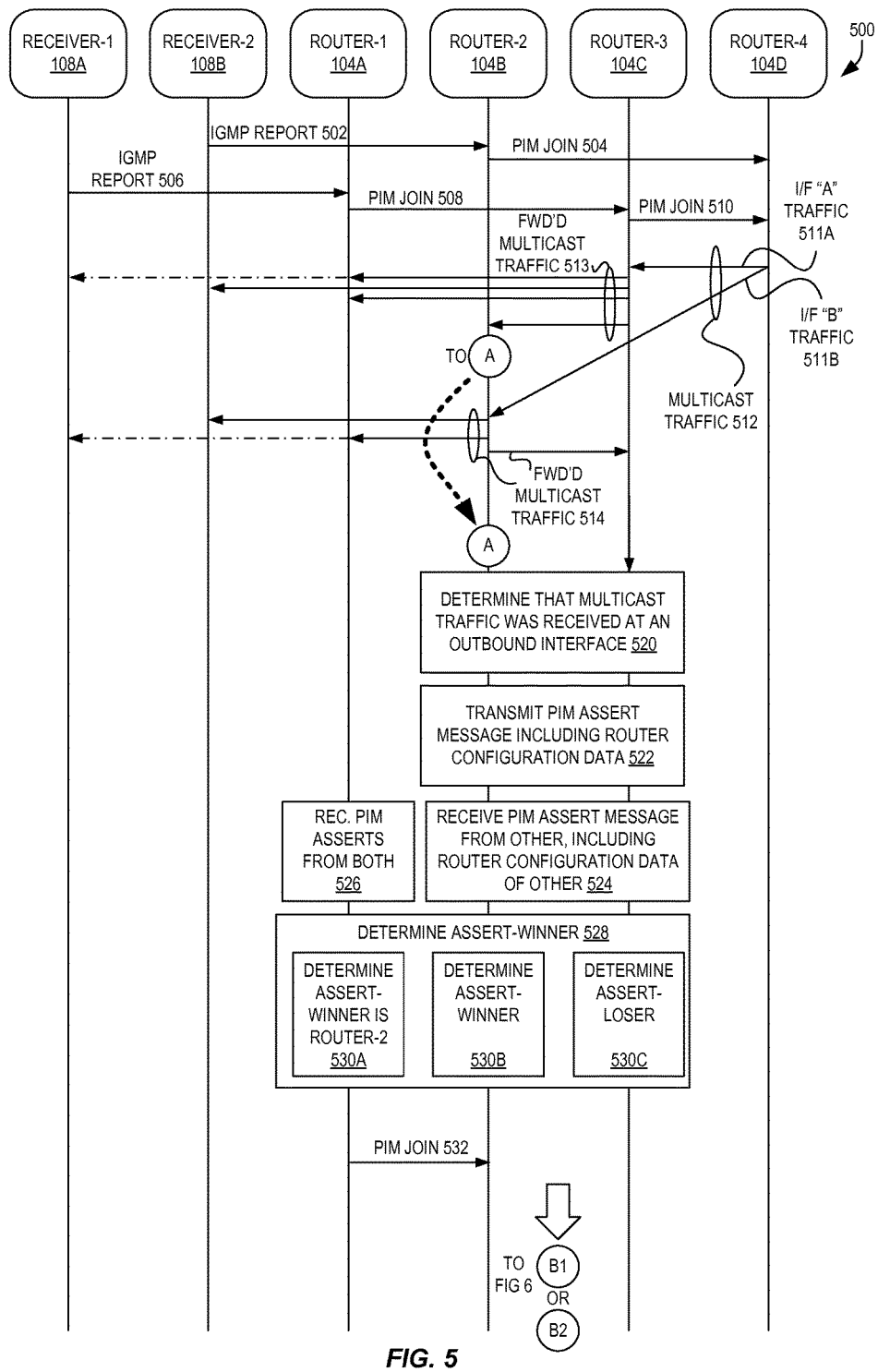
FIG. 5 is a combined sequence and flow diagram illustrating triggering PIM Assert re-election to honor network configuration changes according to some embodiments.
Figure 6:
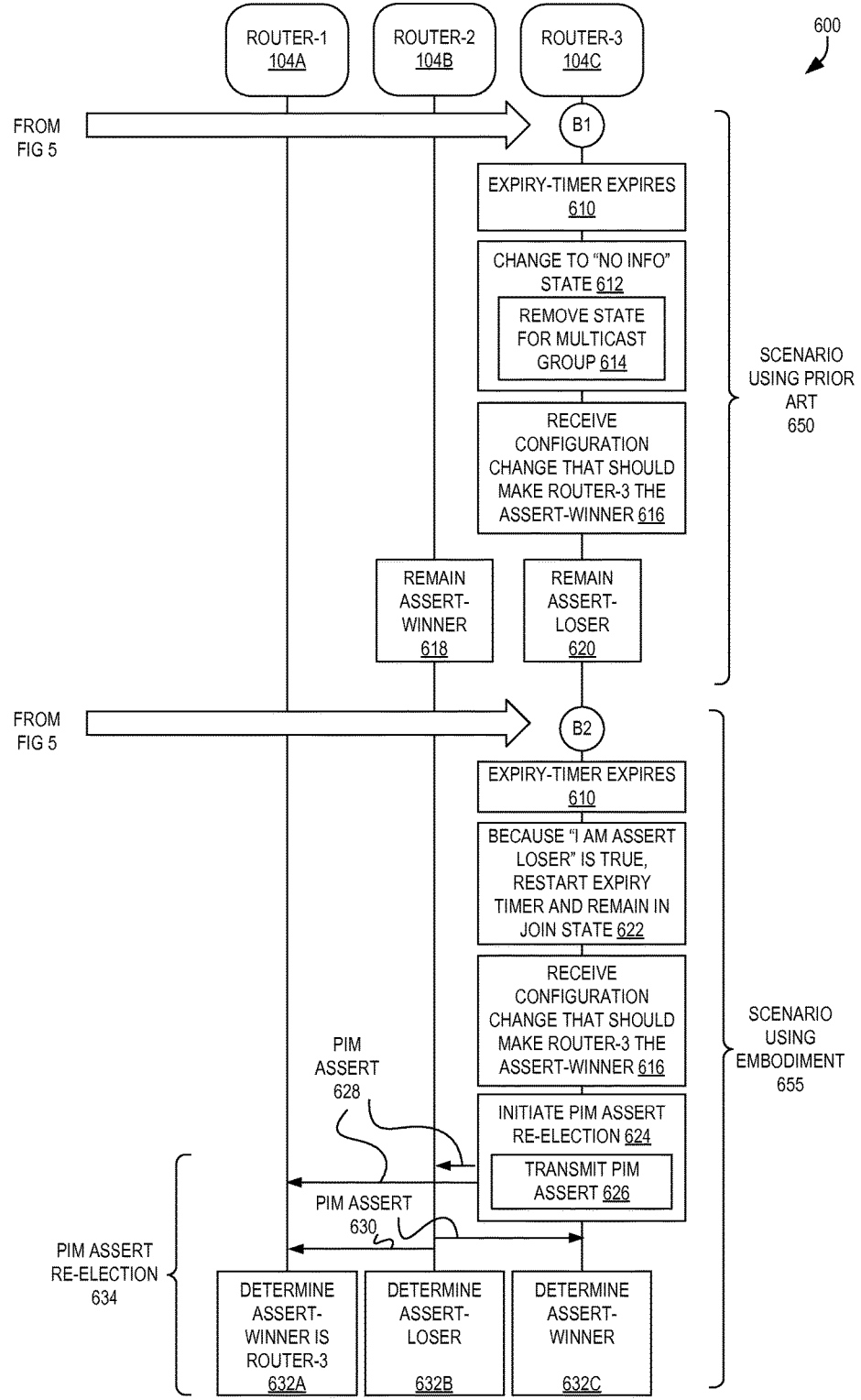
FIG. 6 is a combined sequence and flow diagram continuing the illustration of FIG. 6 for triggering PIM Assert re-election to honor network configuration changes according to some embodiments.

For the sake of understanding, we now turn to a more concrete example presented with regard to FIG. 5 and FIG. 6. FIG. 5 is a combined sequence and flow diagram 500 illustrating triggering PIM Assert re-election to honor network configuration changes according to some embodiments. FIG. 5 includes both Receiver-1 108A and Receiver-2 108B, as well as Router-1 104A, Router-2 104B, Router-3 104C, and Router-4 104D of FIG. 1.

FIG. 5 begins with Receiver-2 108B determining that it wishes to join a multicast group and, in response, transmitting an IGMP Host Membership Report message 502 (or, "IGMP report message") to Router-2 104B as it is configured as the designated router for Receiver-2 108B. IGMP report messages 502 generally are sent when a host attempts to join a multicast group to declare membership in a specific host group. For an IGMPv3 host membership report message, the host can specify interest in receiving multicast traffic from specified sources or from all but a specific set of sources.

From the perspective of Router-2 104B, there are two paths to reach the same source 102—i.e., one via interface (B) leading to Router-4 104D, and another via interface (D) through switch 106 to Router-3 104C and then to Router-4 104D. Accordingly, the direct path over the static protocol 122 to Router-4 104D may be chosen due to static protocol route-preference value of "10" being less than the alternative router-preference value (e.g., of "110"). Accordingly, responsive to receipt of the IGMP report message, Router-2 104B sends a PIM Join message 504 (e.g., a (S, G) Join) to Router-4 104D.

Similarly, Receiver-1 108A also wishes to join the multicast group and thus transmits an IGMP Host Membership Report message 506 to Router-1 104A, as it is configured as the designated router for Receiver-1 108A. In response, Router-1 104A transmits a PIM Join message 508 with the upstream neighbor field populated with Router-3's IP address, as from Router-1's perspective, the path through interfaces (C) and (A) may be chosen to reach source 102. Router-3 104C will then transmit a PIM Join 510 (e.g., a (S, G) Join) to Router-4 104D.

As detailed above, the routers may maintain a multicast routing table (e.g., a PIM mroute) with multicast routing entries having a list of outgoing interfaces (i.e., the "OIFList") to which an incoming multicast data packet, matching the route, is replicated. At this point, the multicast routing entry at Router-4 104D for the multicast group has an OIFList including both interfaces (A) and (B), and thus multicast traffic 512 generated by source 102 matching the route will be forward by Router-4 104D out both of the illustrated interfaces (A) 511A and (B) 511B, and thus will be provided to both Router-2 104B and Router-3 104C.

Each of Router-2 104B and Router-3 104C will then forward this traffic according to their own local multicast routing table entries configured for the multicast group. Thus, Router-3 104C will forward the traffic 513 out of its interface (C) and thereafter will be provided through the switch to Router-2 104B, Router-1 104A (and then to Receiver-1 108A), and to Receiver-2 108B. Similarly, Router-2 104B will forward the traffic 514 out of its interface (D) and thereafter will be provided through the switch to Router-3 104C, Router-1 104A, and to Receiver-2 108B.

Thus, when the multicast traffic flows from the source 102, Router-3 104C will receive traffic on incoming interface (A) from Router-4 104D and also receive the same multicast traffic on outgoing interface (C) from Router-2 104B through switch 106 as shown in FIG. 1. Similarly Router-2 104B will also receive the multicast traffic on both incoming interface (B) from Router-4 104D and also receive the same multicast traffic on outgoing interface (D) from Router-3 104C through switch 106. Generally speaking, an incoming interface is an interface in which multicast traffic is received, and an outgoing interface is an interface in which the multicast traffic is sent.

As defined in RFC 4601 at Section 4.6, "where multiple PIM routers peer over a shared LAN, it is possible for more than one upstream router to have valid forwarding state for a packet, which can lead to packet duplication (see Section 3.6). PIM does not attempt to prevent this from occurring. Instead, it detects when this has happened and elects a single forwarder amongst the upstream routers to prevent further duplication."

Thus, at circle 'A', since Router-2 104B and Router-3 104C both are receiving duplicate packets on a same network segment (e.g., a LAN segment) and can determine this occurrence at block 520. As per the RFC, a single forwarder should be chosen to forward the multicast traffic on the network segment.

Thus, the "PIM Assert" state machine will be triggered on Router-3 104C and Router-2 104B to elect a single forwarder for the segment, which includes transmitting a PIM Assert message including the router configuration data of the sending router at block 522. Then, both of Router-3 104C and Router-2 104B will receive the PIM Assert message from the other at block 524, and further, Router-1 104A will also receive the PIM Assert messages at block 526 from both Router-3 104C and Router-2 104B.

Thereafter, each of Router-1 104A, Router-2 104B, and Router-3 104C can perform the election procedure to determine the Assert-Winner, i.e., which of the two routers will continue forwarding the multicast traffic. In some embodiments, the Assert-Winner is decided in descending order based upon a lowest route-preference value, a lowest route-metric, and finally a highest IP address, as specified by RFC 4601.

In this example, we assume that either the route-preference and/or route-metric values will cause one of the routers to be deemed the Assert-Winner. For example, it could be the case that Router-2 104B and Router-3 104C are routers from different vendors as described earlier with regard to FIGS. 1 and 2, and thus they have different default route-preference values for a same protocol. As another example, it could be the case that Router-2 104B and Router-3 104C could have different route-metric values ("110" for dynamic protocol 120 vs. "10" for static protocol 122) for their routes to the source 102.

Thus, based upon one of these criteria (e.g., lower route-preference or route-metric) as mentioned in RFC 4601, Router-2 104B becomes the Assert-Winner (AW). Each of Router-1 104A, Router-2 104B, and Router-3 104C will determine that Router-2 104B is the Assert-Winner and/or that Router-3 104C is the Assert-Loser at blocks 530A, 530B, and 530C.

Responsive to determining that it is now an Assert-Loser at block 530C, Router-3 104C transitions itself to Assert-Loser state and prunes the interface (A) toward Router-4 104D for the multicast group and thus eliminates the duplicate traffic.

Additionally, responsive to determining that the Assert-Winner for the multicast group is now Router-2 104B, Router-1 104A will update its reverse path forwarding neighbor as per section 4.6.5 of RFC 4601 to Router-2 104B and thus can transmit a PIM Join message 532 to Router-2 104B.

As described in RFC 4601, downstream neighbors send periodic Join (*, G) and Join (S, G) messages to the appropriate RPF' neighbor, i.e., the RPF neighbor as modified by the assert process. They are not always sent to the RPF neighbor as indicated by the MRIB. Normal suppression and override rules apply. The rationale for this is that by sending the periodic and triggered Join messages to the RPF' neighbor instead of to the RPF neighbor, the downstream router avoids re-triggering the Assert process with every PIM Join message. A side effect of sending PIM Join messages to the Assert-Winner is that traffic will not switch back to the "normal" RPF neighbor until the Assert times out.

Thus, Router-1 104A sends the (S, G) PIM Join message 532 with the upstream neighbor set as Router-2 104B. The PIM Join message 532 can include the upstream neighbor field populated with the IP address of Router-2 104B, and thus, this Join message 532 will be ignored by Router-3 104C.

Thereafter, an Assert-Winner timer starts before Assert-Loser timers expire. For example, the Assert Timer (AT) for the Assert-Winner expires at 177 seconds while the Assert timer (AT) for Assert-Loser expires at 180 seconds. Thus, the Assert-Winner Router-2 104B will send a PIM Assert message at the expiry of the Assert-Winner timer before the Assert-Loser's timer fires. This will cause the assert loser to reschedule his assert timer (AT) again before expiry of assert-state of (S, G).

We continue the flow with FIG. 6, which is a combined sequence and flow diagram 600 continuing the illustration of FIG. 6 for triggering PIM Assert re-election to honor network configuration changes according to some embodiments. We first begin at circle 'B1', which illustrates the ongoing scenario 650 using the prior art system compliant with RFC 4601.

As described above, Router-3 104C will be in the Assert-Loser state and will not receive the (S, G) PIM join message 532 from downstream Router-1 104A. Additionally, although the assert timer (AT) of Router-3 104C is reset as explained above, when the Expiry-Timer (ET) expires in Router-3 104C at block 610, the Assert state moves from Assert-Loser state to "No-Info" state in block 612, which includes removing the (S, G) multicast entry from the PIM state machine in block 614.

Thus, due to being in the No-Info state, from this point on Router-3 104C cannot participate in the PIM Assert mechanism, and will ignore an Assert-Winner message from Router-2.

Now at block 616 a configuration change (of routing configuration data) occurs that should make Router-3 104C the Assert-Winner instead of Router-2 104B. For example, the Router-3 104C dynamic protocol route-preference could be set lesser than the static protocol preference of Router-2 104B. As another example, the Router-3 104C route-metric could be set lesser than the route-metric of Router-2 104B.

However, since Router-3 104C is in the Assert No-Info state, it cannot compare its changed configuration data (e.g., route-preference value, route-metric value, IP address value, etc.) with the Assert-Winner's corresponding configuration data. As per RFC 4601, due to (S, G) expiry and the assert No-Info state at Router-3 104C, it will not be able to forward the same (S, G) traffic until a (S, G) Join is sent from Router-1 towards Router-3. Thus, Router-2 104B will remain the Assert-Winner at block 618, and Router-3 104C will remain the Assert-Loser at block 620. As described above, although there are some ways to remedy this discrepancy, these procedures require manual intervention and would lead to traffic disruption for the multicast group, which is not acceptable in many environments.

In contrast, we consider the scenario using the improved solution of the embodiments disclosed herein 655. Upon the expiry of the Expiry-Timer at block 610, Router-3 104C will not change to the No-Info state, but instead, because Router-3 104C is the Assert-Loser, it will restart the Expiry-Timer and remain in the Join state at block 622.

Thereafter, we assume that the configuration change occurs at block 616 that should cause Router-3 104C to become the Assert-Winner, and since Router-3 104C remains in the Join state, it is thus eligible to trigger/initiate a PIM Assert re-election 634 at block 624 by transmitting a PIM Assert message 626, which will be received by Router-2 104B and Router-1 104A as PIM Assert messages 628. In response, to continue the PIM Assert re-election, Router-2 104B will also send its own PIM Assert message 630 that will be received by Router-3 104C and Router-1 104A.

Accordingly, the PIM Assert re-election 634 will lead to Router-1 104A determining that the Assert-Winner is now Router-3 104C at block 632A. Also, Router-2 104B will determine that is now the Assert-Loser at block 632B and may transition itself to the Assert-Loser state and prune the interface (B) toward Router-4 104D for the multicast group. Further, at block 632C, Router-3 104C will determine that it is now the Assert-Winner for the multicast group and thereafter will act as the forwarder of that multicast traffic on the network segment 130.

Figure 7:
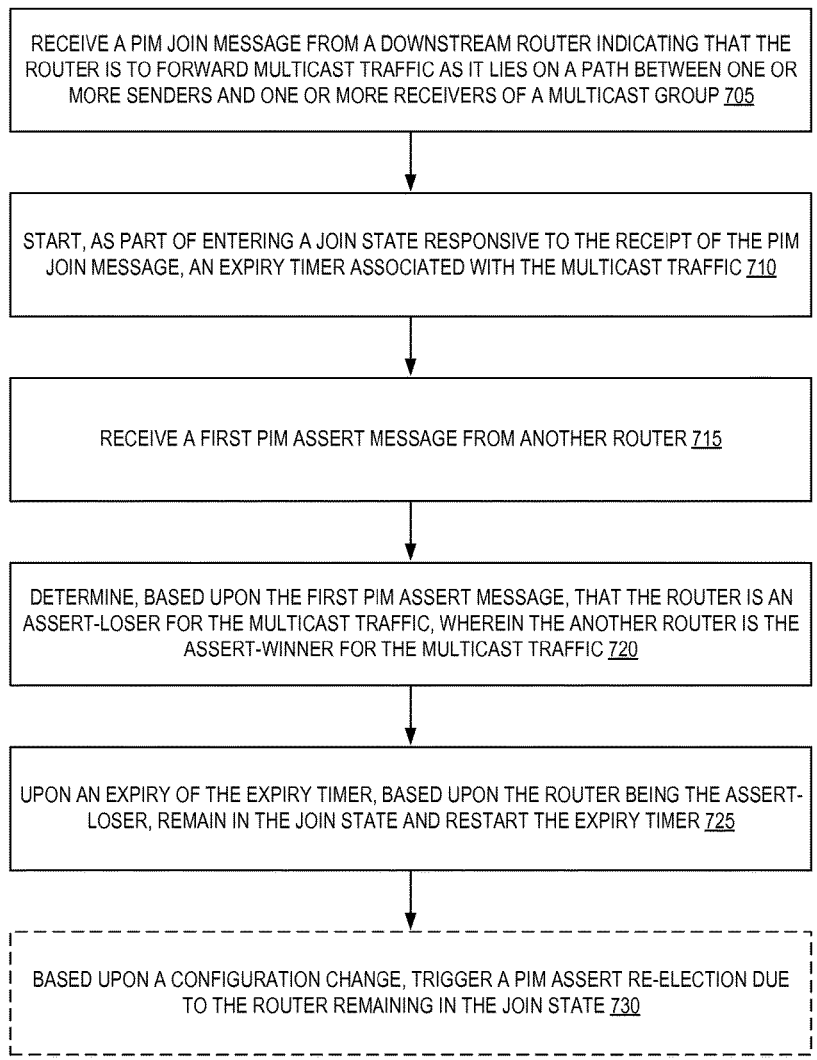
FIG. 7 is block diagram illustrating a flow in a router for enabling PIM Assert re-election triggering to honor network configuration changes according to some embodiments.

Accordingly, FIG. 7 is block diagram illustrating a flow 700 in a router for enabling PIM Assert re-election triggering to honor network configuration changes according to some embodiments. As one example, the flow 700 may be performed by the Router-3 104C of FIG. 1.

The flow 700 includes, at block 705, receiving a PIM Join message from a downstream router indicating that the router is to forward multicast traffic because it lies on a path between one or more senders and one or more receivers of a multicast group. In response, the router may install a multicast routing entry for the multicast traffic identifying an incoming interface, outgoing interface, network address of the traffic source(s), and network address for the group. Additionally, at block 710, the flow 700 can include starting, as part of entering a Join state responsive to the receipt of the PIM join message, an Expiry-Timer associated with the multicast traffic.

The flow, at block 715, includes receiving a first PIM Assert message from another router, and at block 720 determining, based upon the first PIM Assert message, that the router is an Assert-Loser for the multicast traffic. The another router is an Assert-Winner for the multicast traffic. Then, at block 725, upon an expiry of the Expiry-Timer, based upon the router being the Assert-Loser, the flow 700 includes remaining in the Join state and restarting the Expiry-Timer.

Thereafter, optionally the flow 700 includes block 730 where, based upon a routing configuration change (e.g., a change of a route-preference, route-metric, IP address, etc.), a PIM Assert re-election can be triggered due to the router remaining in the Join state. Block 730 can include transmitting a PIM Assert message to be received at the another router, and thereafter, the router may receive another PIM Assert message from the another router, and determine whether it should remain the Assert-Loser or switch to become the Assert-Winner.

Figure 8:
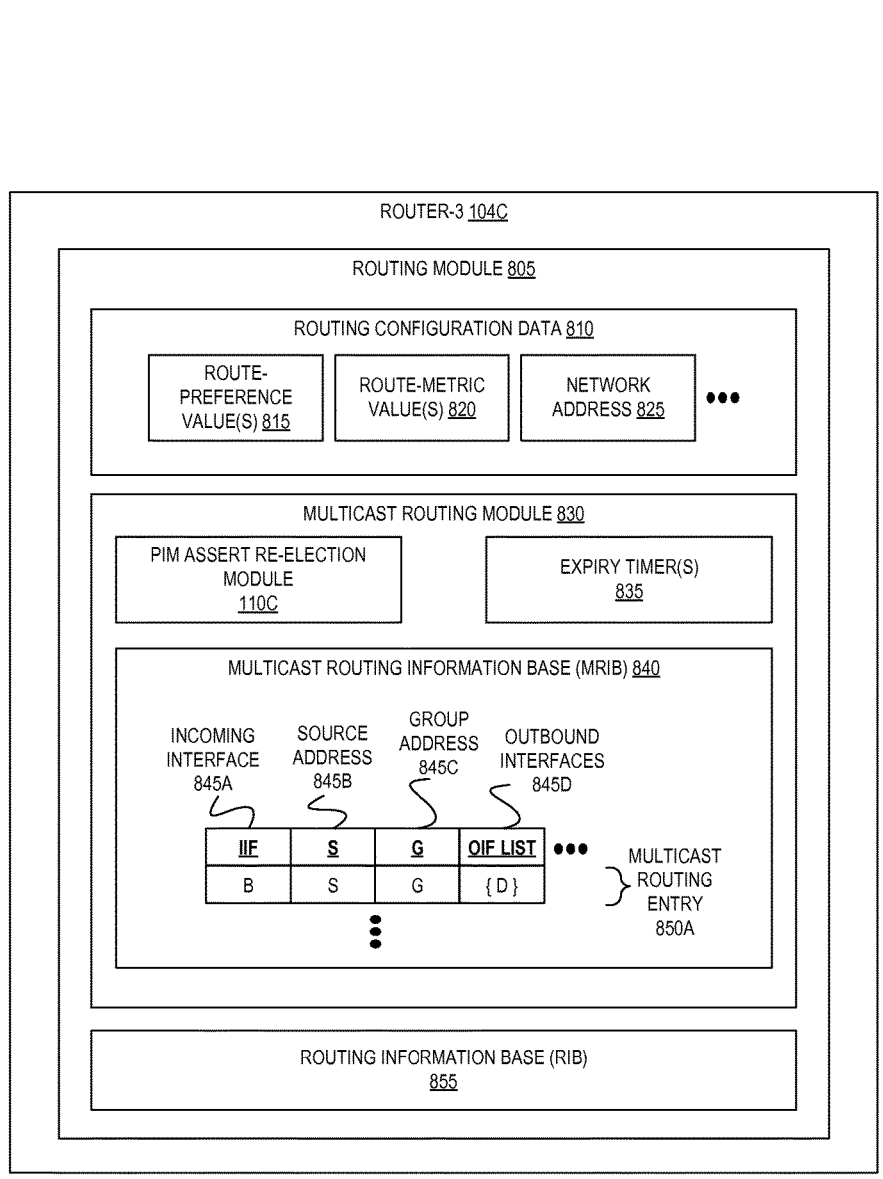
FIG. 8 is a high-level block diagram illustrating a multicast routing module of a router with a PIM Assert re-election module according to some embodiments.

FIG. 8 is a high-level block diagram illustrating a multicast routing module 830 of a router 104C with a PIM Assert re-election module 110C according to some embodiments. The router 104C includes a routing module 805 with a routing information base (RIB) 855 known to those of skill in the art (e.g., for unicast routing entries), a multicast routing module 830, and routing configuration data 810.

The routing configuration data 810 can store default and/or configurable values that can be used in PIM Assert elections, such as route-preference values 815 for different types of networks/protocols, route-metric values 820, and network addresses 825 (e.g., utilized by the Router-3 104C).

The multicast routing module 830 includes a PIM Assert Re-election Module 110C that can be configured to make the state transitions and corresponding determinations disclosed herein and/or cause PIM Assert messages to be transmitted (e.g., by non-illustrated network interfaces of the Router-3 104C).

The multicast routing module 830 also includes a multicast routing information base (MRIB) 840 maintaining multicast routing entries (e.g., 850A). Each multicast routing entry can include a value corresponding to an attribute. The attributes for each entry can include an incoming interface 845A identifier, a network address of a multicast source 845B, a multicast group address 845C, and a set of outbound interface identifiers 845D that the Router-3 104C is to forward received multicast traffic matching the entry out of. Of course, other attributes can be utilized in other embodiments, and in many deployments the Router-3 104C may have many more (or even fewer) multicast routing entries 850.

The multicast routing module 830 also includes one or more timers, such as Expiry-Timers 835. The multicast routing module 830 may set and decrement these timers, which can be associated with particular multicast groups as disclosed throughout this description.

Various embodiments disclosed herein involve the use of electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of various embodiments may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 9A illustrates connectivity between network devices (NDs) within an exemplary network, as well as three exemplary implementations of the NDs, according to some embodiments. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application—specific integrated—circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920—including the PIM Assert Re-election Module 990A—may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

As described herein, the PIM Assert Re-election Module 990A can include code which when executed by networking hardware 910, causes networking hardware 910 to implement perform operations described herein for triggering PIM Assert Re-election to honor network configuration changes according to one or more embodiments as part of networking software instances 922.

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments. FIG. 9B shows a special-purpose network device including cards 938 (typically hot-pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate one or more sets of one or more applications 964A-R. This can include executing code for the PIM Assert Re-election module 990B to enable triggering PIM Assert Re-election to honor network configuration changes as described herein with regard to the various disclosed embodiments using one or more processor(s) 942.

While one embodiment does not implement virtualization, alternative embodiments may use different forms of virtualization—represented by a virtualization layer 954 and software containers 962A-R. For example, one such alternative embodiment implements operating system-level virtualization, in which case the virtualization layer 954 represents the kernel of an operating system (or a shim executing on a base operating system) that allows for the creation of multiple software containers 962A-R that may each be used to execute one of the sets of applications 964A-R. In this embodiment, the multiple software containers 962A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 954 represents a hypervisor (sometimes referred to as a virtual machine monitor (VMM)) or a hypervisor executing on top of a host operating system; and 2) the software containers 962A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 964A-R, as well as the virtualization layer 954 and software containers 962A-R if implemented, are collectively referred to as software instance(s) 952. Each set of applications 964A-R, corresponding software container 962A-R if implemented, and that part of the hardware 940 that executes them (be it hardware dedicated to that execution and/or time slices of hardware temporally shared by software containers 962A-R), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments may implement one or more of the software container(s) 962A-R differently. For example, while some embodiments are illustrated with each software container 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 962A-R to VNEs also apply to embodiments where such a finer level of granularity is used.

In certain embodiments, the virtualization layer 954 includes a virtual switch that provides similar forwarding services as a physical Ethernet switch. Specifically, this virtual switch forwards traffic between software containers 962A-R and the NIC(s) 944, as well as optionally between the software containers 962A-R; in addition, this virtual switch may enforce network isolation between the VNEs 960A-R that by policy are not permitted to communicate with each other (e.g., by honoring virtual local area networks (VLANs)).

Software 950 can include code for the PIM Assert Re-election Module 990B which when executed by processor(s) 942, causes processor(s) 942 to perform operations of one or more embodiments as part of software containers 962A-R.

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, Global Positioning System (GPS) units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email or social services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software containers 962A-R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

Figure 10:
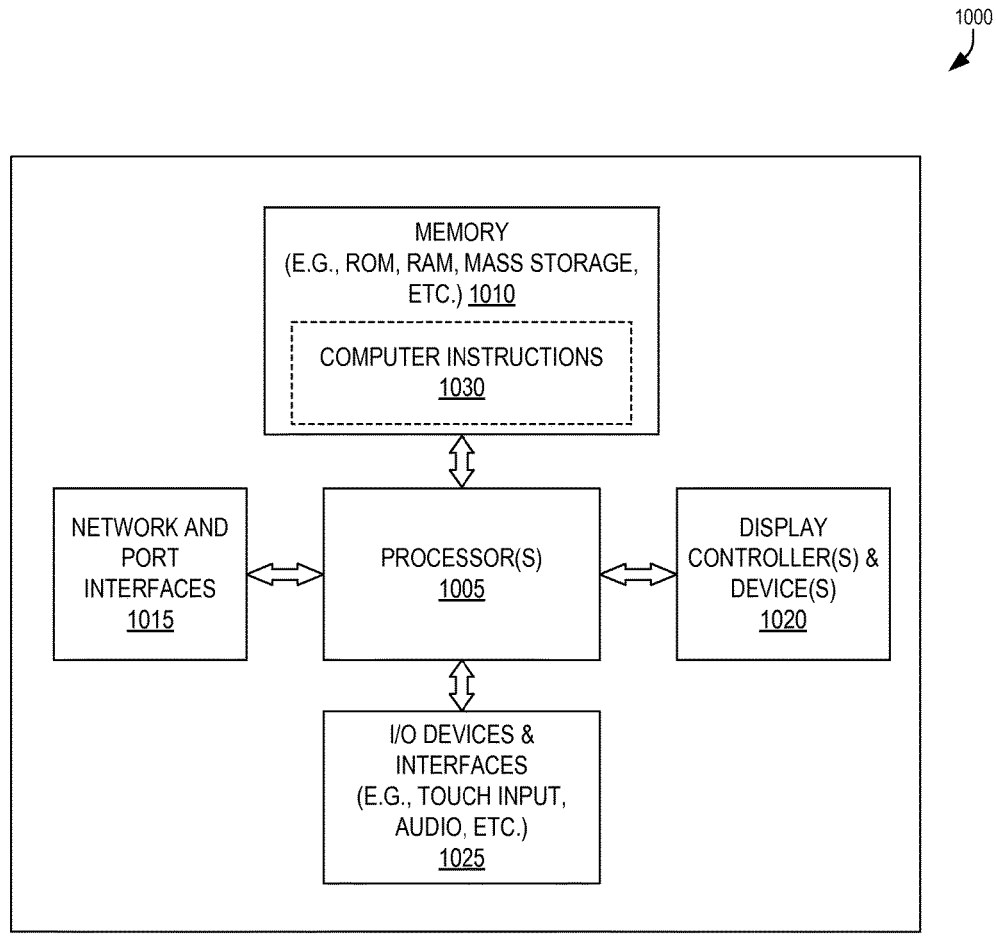
FIG. 10 is a block diagram illustrating an exemplary data processing system that may be used in some embodiments.

FIG. 10 illustrates a block diagram for an exemplary data processing system 1000 that may be used in some embodiments. Data processing system 1000 includes one or more microprocessors 1005 and connected system components (e.g., multiple connected chips). Alternatively, the data processing system 1000 is a system on a chip. One or more such data processing systems 1000 may be utilized to implement the functionality of the modules, server end stations, hosts, or other devices as illustrated above in FIGS. 1-9.

The data processing system 1000 includes memory 1010, which is coupled to the microprocessor(s) 1005. The memory 1010 may be used for storing data, metadata, and programs for execution by the microprocessor(s) 1005. For example, the depicted memory 1010 may store computer instructions 1030 that, when executed by the microprocessor(s) 1005, causes the data processing system 1000 to perform the operations described herein. The memory 1010 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 1010 may be internal or distributed memory. In some embodiments, a portion or all of the computer instructions 1030 are stored on an external cloud device.

The data processing system 1000 may also include a display controller and display device 1020 that provides a visual user interface for the user, e.g., Graphical User Interface (GUI) elements or windows. The display device 1020 may also display various media content to the user. The data processing system 1000 also includes one or more input or output ("I/O") devices and interfaces 1025, which are provided to allow a user to provide input to, receive output from, and otherwise transfer data to and from the system. These I/O devices 1025 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1000. The I/O devices and interfaces 1025 may also include a connector for a dock or a connector for a Universal Serial Bus (USB) interface, FireWire, Thunderbolt, Ethernet, etc., to connect the system 1000 with another device, external component, or a network. Exemplary I/O devices and interfaces 1025 also include wireless transceivers, such as an Institute of Electrical and Electronics Engineers (IEEE) 1002.11 transceiver, an infrared transceiver, a Bluetooth transceiver, a wireless cellular telephony transceiver (e.g., 2G, 3G, 4G, 5G), or another wireless protocol to connect the data processing system 1000 with another device, external component, or a network and receive stored instructions, data, tokens, etc. In some embodiments, these various components will be provided as a system on a chip (SoC). It will be appreciated that one or more buses may be used to interconnect the various components shown in FIG. 10.

For example, the data processing system 1000 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 1000 may be a network computer, server, network device, router, or an embedded processing device within another device or consumer electronic product. As used herein, the terms computer, system, device, processing device, and "apparatus comprising a processing device" may be used interchangeably with the term data processing system 1000 and include the above-listed exemplary embodiments.

It will be appreciated that additional components, not shown, may also be part of the system 1000, and, in some embodiments, fewer components than that shown in FIG. 10 may also be used in a data processing system 1000. For example, in some embodiments where the data processing system 1000 is a router, the router may have one or more control cards configure routing in the network and one or more line cards to switch packets in a network based on the routing configuration from the control cards.

It will be apparent from this description that aspects of the disclosed embodiments may be embodied, at least in part, in software. That is, the computer-implemented methods may be carried out in a computer system or other data processing system in response to its processor or processing system executing sequences of instructions contained in a memory, such as memory 1010 or other non-transitory machine-readable storage medium. The software may further be transmitted or received over a network (not shown) via a network and/or port interface 1015. In various embodiments, hardwired circuitry may be used in combination with the software instructions to implement the present embodiments. Thus, the techniques are not limited to any specific combination of hardware circuitry and software, or to any particular source for the instructions executed by the data processing system 1000.

An electronic device, such as a server computing device, stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of some embodiments may be implemented using different combinations of software, firmware, and/or hardware.

Alternative Embodiments

The operations in the flow diagrams have been described with reference to the exemplary embodiments of the other diagrams. However, it should be understood that the operations of the flow diagrams can be performed by embodiments other than those discussed with reference to these other diagrams, and the embodiments discussed with reference these other diagrams can perform operations different than those discussed with reference to the flow diagrams.

Similarly, while the flow diagrams in the figures show a particular order of operations performed by some embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, various embodiments are not described with reference to any particular programming language. It will be appreciated that a variety of programming languages may be used to implement the teachings of the embodiments described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a network element acting as a router for honoring routing configuration changes by triggering Protocol Independent Multicast (PIM) Assert re-election without multicast traffic interruption, the method comprising:
   receiving, at the router, a PIM join message from a downstream router indicating that the router is to forward multicast traffic because it lies on a path between one or more senders and one or more receivers of a multicast group;
   starting, by the router as part of entering a Join state responsive to the receipt of the PIM join message, an Expiry-Timer associated with the multicast traffic, wherein upon an expiration of the Expiry-Timer the router is to transition from the Join state to a NoInfo state for the multicast traffic and is to remove state associated with the multicast traffic;
   receiving, at the router, a first PIM Assert message from another router;
   resetting, by the router, an Assert Timer that is associated with the multicast traffic based on the receiving of the first PIM Assert message;
   determining, by the router based upon the first PIM Assert message, that the router is an Assert-Loser for the multicast traffic, wherein the another router is an Assert-Winner for the multicast traffic; and
   upon an expiry of the Expiry-Timer, based upon the router being the Assert-Loser, remaining in the Join state and restarting the Expiry-Timer.

2. The method of claim 1, further comprising:
   after the restarting of the Expiry-Timer and while the router remains in the Join state,
      determining, by the router, that a router configuration data value has changed, and
      initiating a PIM Assert re-election by transmitting a second PIM Assert message including the changed router configuration data to the another router.

3. The method of claim 2, wherein the router configuration data value comprises at least one of:
   a route-preference value;
   a route-metric value; and
   a network address of the router.

4. The method of claim 2, further comprising:
   receiving, at the router, a third PIM Assert message from the another router; and
   determining, based upon the third PIM Assert message, that the router is now the Assert-Winner for the multicast traffic.

5. The method of claim 4, further comprising:
   after the determining that the router is now the Assert-Winner,
      receiving, at the router, one or more packets of the multicast traffic at an incoming interface; and
      sending, by the router, the one or more packets of the multicast traffic out one or more outbound interfaces.

6. The method of claim 1, wherein:
   the another router is part of another path for the multicast traffic leading to another receiver of the multicast group; and
   the router and the another router are managed by different administrative authorities or manufactured by different vendors.

7. A non-transitory computer readable storage medium having instructions which, when executed by one or more processors of an electronic device, cause the electronic device to implement a router configured to honor routing configuration changes by triggering Protocol Independent Multicast (PIM) Assert re-election without multicast traffic interruption by performing operations comprising:
   receiving a PIM join message from a downstream router indicating that the router is to forward multicast traffic because it lies on a path between one or more senders and one or more receivers of a multicast group;
   starting, as part of entering a Join state responsive to the receipt of the PIM join message, an Expiry-Timer associated with the multicast traffic, wherein upon an expiration of the Expiry-Timer the router is to transition from the Join state to a NoInfo state for the multicast traffic and is to remove state associated with the multicast traffic;
   receiving a first PIM Assert message from another router;
   resetting, by the router, an Assert Timer that is associated with the multicast traffic based on the receiving of the first PIM Assert message;
   determining, based upon the first PIM Assert message, that the router is an Assert-Loser for the multicast traffic, wherein the another router is an Assert-Winner for the multicast traffic; and upon an expiry of the Expiry-Timer, based upon the router being the Assert-Loser, remaining in the Join state and restarting the Expiry-Timer.

8. The non-transitory computer readable storage medium of claim 7, wherein the operations further comprise:

after the restarting of the Expiry-Timer and while the router remains in the Join state, determining that a router configuration data value has changed, and initiating a PIM Assert re-election by transmitting a second PIM Assert message including the changed router configuration data to the another router.

9. The non-transitory computer readable storage medium of claim 8, wherein the router configuration data value comprises at least one of:

a route-preference value;

a route-metric value; and a network address of the router.

10. The non-transitory computer readable storage medium of claim 8, wherein the operations further comprise:

receiving a third PIM Assert message from the another router; and determining, based upon the third PIM Assert message, that the router is now the Assert-Winner for the multicast traffic.

11. The non-transitory computer readable storage medium of claim 10, wherein the operations further comprise:

after the determining that the router is now the Assert-Winner, receiving one or more packets of the multicast traffic at an incoming interface; and sending the one or more packets of the multicast traffic out one or more outbound interfaces.

12. The non-transitory computer readable storage medium of claim 7, wherein:

the another router is part of another path for the multicast traffic leading to another receiver of the multicast group; and the router and the another router are managed by different administrative authorities or manufactured by different vendors.

13. An electronic device, comprising:

one or more processors; and a non-transitory computer readable storage medium having instructions which, when executed by the one or more processors, cause the electronic device to implement a router configured to honor routing configuration changes by triggering Protocol Independent Multicast (PIM) Assert re-election without multicast traffic interruption by performing operations comprising:

receiving a PIM join message from a downstream router indicating that the router is to forward multicast traffic because it lies on a path between one or more senders and one or more receivers of a multicast group;

starting, as part of entering a Join state responsive to the receipt of the PIM join message, an Expiry-Timer associated with the multicast traffic, wherein upon an expiration of the Expiry-Timer the router is to transition from the Join state to a NoInfo state for the multicast traffic and is to remove state associated with the multicast traffic;

receiving a first PIM Assert message from another router;

resetting, by the router, an Assert Timer that is associated with the multicast traffic based on the receiving of the first PIM Assert message;

determining, based upon the first PIM Assert message, that the router is an Assert-Loser for the multicast traffic, wherein the another router is an Assert-Winner for the multicast traffic; and upon an expiry of the Expiry-Timer, based upon the router being the Assert-Loser, remaining in the Join state and restarting the Expiry-Timer.

14. The electronic device of claim 13, wherein the operations further comprise:

after the restarting of the Expiry-Timer and while the router remains in the Join state, determining that a router configuration data value has changed, and initiating a PIM Assert re-election by transmitting a second PIM Assert message including the changed router configuration data to the another router.

15. The electronic device of claim 14, wherein the router configuration data value comprises at least one of:

a route-preference value;

a route-metric value; and a network address of the router.

16. The electronic device of claim 14, wherein the operations further comprise':

receiving a third PIM Assert message from the another router; and determining, based upon the third PIM Assert message, that the router is now the Assert-Winner for the multicast traffic.

17. The electronic device of claim 16, wherein the operations further comprise:

after the determining that the router is now the Assert-Winner, receiving one or more packets of the multicast traffic at an incoming interface; and sending the one or more packets of the multicast traffic out one or more outbound interfaces.

18. The electronic device of claim 13, wherein:

the another router is part of another path for the multicast traffic leading to another receiver of the multicast group; and the router and the another router are managed by different administrative authorities or manufactured by different vendors.

* * * * *